(12) United States Patent
Iwata et al.

(10) Patent No.: US 8,002,998 B2
(45) Date of Patent: Aug. 23, 2011

(54) METHOD OF PRODUCING A SLAB TYPE TWO-DIMENSIONAL PHOTONIC CRYSTAL STRUCTURE

(75) Inventors: Yuichi Iwata, Nagoya (JP); Osamu Mitomi, Nagoya (JP); Jungo Kondo, Nishikamo-Gun (JP); Kenji Aoki, Ichinomiya (JP); Takashi Yoshino, Ama-Gun (JP); Akira Hamajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1014 days.

(21) Appl. No.: 11/842,277

(22) Filed: Aug. 21, 2007

(65) Prior Publication Data

US 2008/0047928 A1    Feb. 28, 2008

(30) Foreign Application Priority Data

Aug. 25, 2006   (JP) .................... 2006-229210

(51) Int. Cl.
 *B29D 11/00* (2006.01)
(52) U.S. Cl. ............ 216/24; 438/689; 385/129
(58) Field of Classification Search ........... 216/24; 439/689; 385/129; 438/689
 See application file for complete search history.

(56) References Cited

U.S. PATENT DOCUMENTS

| | | | |
|---|---|---|---|
| 5,205,902 A | 4/1993 | Horton et al. | |
| 6,613,241 B1 | 9/2003 | Scherer et al. | |
| 7,628,906 B2 * | 12/2009 | Kochergin et al. | 205/656 |
| 2002/0118941 A1 | 8/2002 | Notomi et al. | |
| 2004/0241997 A1 * | 12/2004 | Ikeda | 438/689 |
| 2005/0002605 A1 * | 1/2005 | Sakai et al. | 385/27 |
| 2005/0002607 A1 * | 1/2005 | Neuhaus et al. | 385/31 |
| 2006/0034577 A1 | 2/2006 | Furuya et al. | |
| 2007/0009219 A1 | 1/2007 | Hatsuda et al. | |

FOREIGN PATENT DOCUMENTS

| | | |
|---|---|---|
| JP | 2002-350657 A1 | 12/2002 |
| JP | 2003-066858 A1 | 3/2003 |
| JP | 2003-156642 A1 | 5/2003 |
| JP | 2005-070163 A1 | 3/2005 |
| JP | 2005-091925 | 4/2005 |
| JP | 2005-172932 A1 | 6/2005 |
| WO | 2004/049012 | 6/2004 |
| WO | 2005/114279 | 12/2005 |

* cited by examiner

*Primary Examiner* — Nadine G Norton
*Assistant Examiner* — Mahmoud Dahimene
(74) *Attorney, Agent, or Firm* — Burr & Brown

(57) ABSTRACT

A first main face of a substrate of a dielectric single crystal is etched to form recesses in the substrate. A second main face of the substrate is mechanically processed to form a slab, so that the recesses pass through the substrate to form through holes.

5 Claims, 7 Drawing Sheets

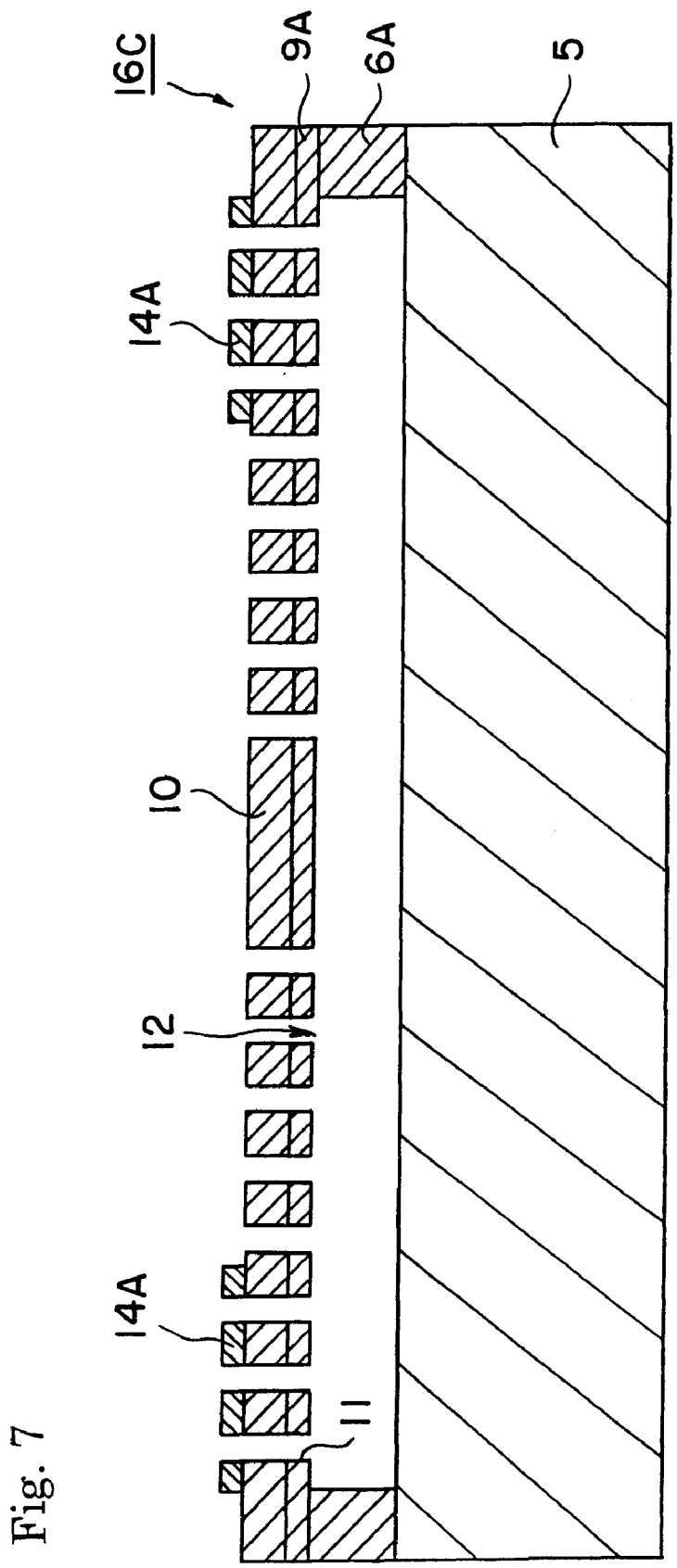

METHOD OF PRODUCING A SLAB TYPE TWO-DIMENSIONAL PHOTONIC CRYSTAL STRUCTURE

This application claims the benefit of Japanese Patent Application P 2006-229210 filed on Aug. 25, 2006, the entirety of which is incorporated by reference.

BACKGROUND OF THE INVENTION

1. Field of the Invention

The present invention relates to a method of producing a slab type two-dimensional photonic crystal structure.

2. Related Art Statement

An optical device utilizing a photonic crystal has a structure of repeating different kinds of dielectric materials having different dielectric constants. According to such devices, the internal multiple reflection phenomenon is utilized to provide various kinds of devices having superior functions and of very small sizes. Since the principle of function of the device is based on multiple reflection phenomenon, the device properties have a strong dependency on frequency (wavelength) in the vicinity of a specific frequency. The frequency is decided upon the material (refractive index N) of a substrate for a photonic crystal and a length d of period of repetition of the photonic crystal structure. The dependency of the device on frequency is characteristic to the device. However, in the case that the device is used in a wide range of wavelength, the characteristics would turn to be a defect.

An optical waveguide utilizing a slab-type and two-dimensional photonic crystal is described, for example, in the following documents.

Japanese patent publication No. 2005-172932A
Japanese patent publication No. 2003-156642A
Japanese patent publication No. 2005-70163A
Japanese patent publication No. 2002-350657A

SUMMARY OF THE INVENTION

For example, an optical waveguide structure fabricated in a two-dimensional and triangle lattice photonic crystal can be easily produced, so that its practical application has been extensively investigated. It is, however, difficult to from many spaces or through holes in regularly positioned manner, so that the productivity is low. Further, it is more difficult to form many fine through holes or spaces in a dielectric single crystal having a high hardness at a high precision. In the case that the precision is low, the slab-type and two-dimensional photonic crystal structure would not provide desired electro-optic effects.

An object of the present invention is to provide a method of forming many through holes at a high precision in producing a slab-type two-dimensional photonic crystal structure having a slab of a dielectric single crystal and lattice columns composed of the through holes.

The present invention provides a method of producing a slab type two-dimensional photonic crystal structure having a slab of a dielectric single crystal and a lattice column having through holes formed therein. The method has the steps of:

forming recesses in a substrate of a dielectric single crystal by etching a first main face of the substrate of the dielectric single crystal; and forming a slab by mechanically processing a second main face of the substrate so that the recesses pass through the slab to form the through holes The inventors have reached an idea of providing recesses on a, first main face of a substrate of a dielectric single crystal by etching and of mechanically processing the substrate at its second main face so that the recesses are opened to the side of the second main face to form through holes. It is possible to carry out the technique of forming many recesses at a regular interval by etching in the substrate of dielectric single crystal, at a high precision and high productivity. After many recesses are formed in the substrate at a regular interval, the substrate is mechanically processed at the second main face so that the recesses pass through the substrate to form the through holes. The precision of the thus obtained through hole is substantially decided upon the precision of the corresponding recess. It is thus possible to form many through holes at a high precision and high productivity. The precision and productivity of the slab-type and two-dimensional crystal structure can be thereby improved and its practical applicability can be considerably improved. The present invention is thus useful in the industry.

BRIEF DESCRIPTION OF THE DRAWINGS

FIG. 7 is a cross sectional view showing a slab-type and two-dimensional photonic crystal structure 16C obtained according to the present invention.

DETAILED DESCRIPTION OF THE INVENTION

Figure 1:
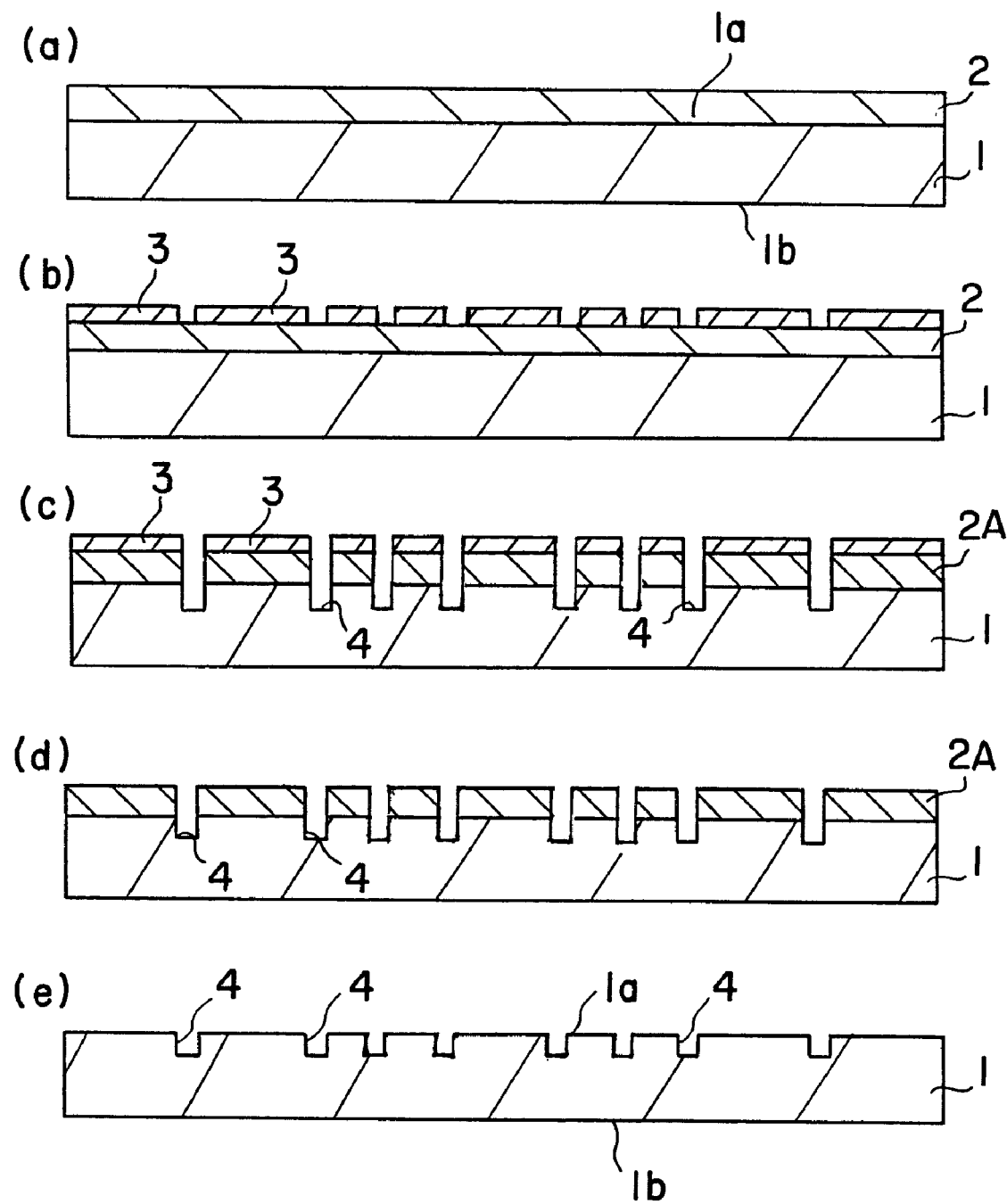
FIGS. 1(a), 1(b), 1(c), 1(d) and 1(e) are cross sectional views showing respective steps of forming recesses 4 in a substrate 1 of a dielectric single crystal.

A photonic crystal is a multi-dimension and periodic structure having a periodicity comparable with a wavelength of light with a plurality of media having different refractive indices. The photonic crystal has a band structure of light similar to that of electron. Specific structure thus provides photonic band gap of light. The photonic crystal having the photonic band gap functions as an insulator of light.

Linear defects can be introduced into a photonic crystal having photonic band-gap for deteriorating its periodicity. It is thereby possible to form waveguide mode in a frequency region of the band-gap and to provide an optical waveguide confining light.

A slab-type two-dimensional photonic crystal 15 is defined as follows. That is, to a dielectric slab, low dielectric pillars are provided at an appropriate two-dimensional period. Each dielectric pillar has a refractive index lower than that of the dielectric slab and has a shape of a column or an equilateral polygon. The dielectric slab is provided between a upper clad and a lower clad to provide the photonic crystal. The upper and lower clads have a refractive index lower than that of the dielectric slab.

The method of forming an optical waveguide in the crystal is not particularly limited. For example, so-called oxide clad two-dimensional slab-type photonic crystal is preferable because it is possible to easily produce the crystal of a large area. The oxide clad two-dimensional type photonic crystal is produced as follows. A thin film of a semiconductor of a high refractive index (refractive index of about 3 to 3.5) is formed on a dielectric material (oxide or polymer) of a low refractive index, in which a two-dimensional photonic crystal structure is fabricated.

Further, so-called air-bridge type two-dimensional slab photonic crystal may be applied. According to this type, the upper and lower clads of the photonic crystal are composed of air layers.

The dielectric single crystal includes quartz, lithium niobate single crystal, lithium tantalate single crystal, single crystal of lithium niobate-lithium tantalate solid solution, lithium borate single crystal and langasite single crystal. The substrate of the dielectric single crystal may be either of a Z-plate, X-plate (Y-plate) or the off-set plate of Z-plate or X-plate (Y-plate).

Further, it is necessary that the through holes are arranged to form regular lattices. Although the shape of the lattice is not particularly limited, triangular lattice and regular quadratic lattice are listed. Further, air filled in the through holes is a kind of a dielectric material so that the through holes can function as the dielectric pillars. Further, solid or gaseous dielectric material other than air may be filled into the through holes to form the dielectric pillars each filled with the material.

The present invention will be described in detail, referring to the attached drawings.

First, as shown in FIG. 1(a), a substrate 1 (for example a wafer) of a dielectric single crystal is prepared. A metal film 2 is formed on the whole of a first main face 1a of the substrate 1. Although the kind of the metal film is not particularly limited as far as it has resistance against an etchant or a etching gas of the substrate, it may be listed multilayered films of underlying Cr layer and Au layer laminated thereon, multilayered films of underlying Ti layer and Au layer laminated thereon, tungsten film and molybdenum film. The method of film formation is not particularly limited, and sputtering and vapor deposition are listed.

The method of etching the metal film 2 and the substrate 1 of dielectric single crystal is not particularly limited, and includes dry etching and wet etching. Wet etching is preferred.

The method of etching the metal film itself is known. For example, aqueous solution of iodine and potassium iodide is preferred as an etchant for gold, and aqueous solution of ammonium cerium nitrate and perchloric acid is preferred as an etchant for chromium. Further, in the case that gold and chromium are etched at the same time, aqueous solution of ammonium cerium nitrate, perchloric acid and hydrochloric acid is preferred. In the case of dry etching, $Cl_2$ is preferred as an etchant for gold and mixture of $CCl_4$ and $O_2$ is preferred as an etchant for chromium.

The method itself of etching a dielectric single crystal is also known. For example, the etchant includes solution of hydrogen fluoride, solution of ammonium hydrogen fluoride, buffered fluoric acid solution (mixture of ammonium hydrogen fluoride and ammonium fluoride), solution of sodium hydroxide and the like. The etching gas includes $CF_4$, $SF_6$ and the like.

Preferably, a resist 3 is formed on the metal film 2 (FIG. 1 (b)). The method of forming the resist 3 is not limited, and includes photolithography using a stepper. The metal film 2 and dielectric single crystal 1 are then etched by dry etching or wet etching to form recesses 4 (FIG. 1 (c)). Unnecessary resist 3 is then removed with an organic solvent (FIG. 1 (d)). The metal film 2A is removed to obtain a substrate 1 of a dielectric single crystal 1 with the recesses 4 formed therein, as shown in FIG. 1 (e). For example, molybdenum film can be removed with mixed acid of nitric acid and phosphoric acid.

The patterning of the resist can be performed by conventional exposure process. A contact aligner may be used upon the exposure.

The material of the resist is needed to be resistive against the etchant for the metal film. Such material includes novolak resin type positive resist, main-chain scission (degradation) type positive resist, cyclized polyisoprene-azide compound series negative resist, phenol resin-azide compound series negative resist, dissolution-inhibition type electron rays positive resist and cross-linked type negative resist.

The method of processing the base body 5 will be described.

Figure 2:
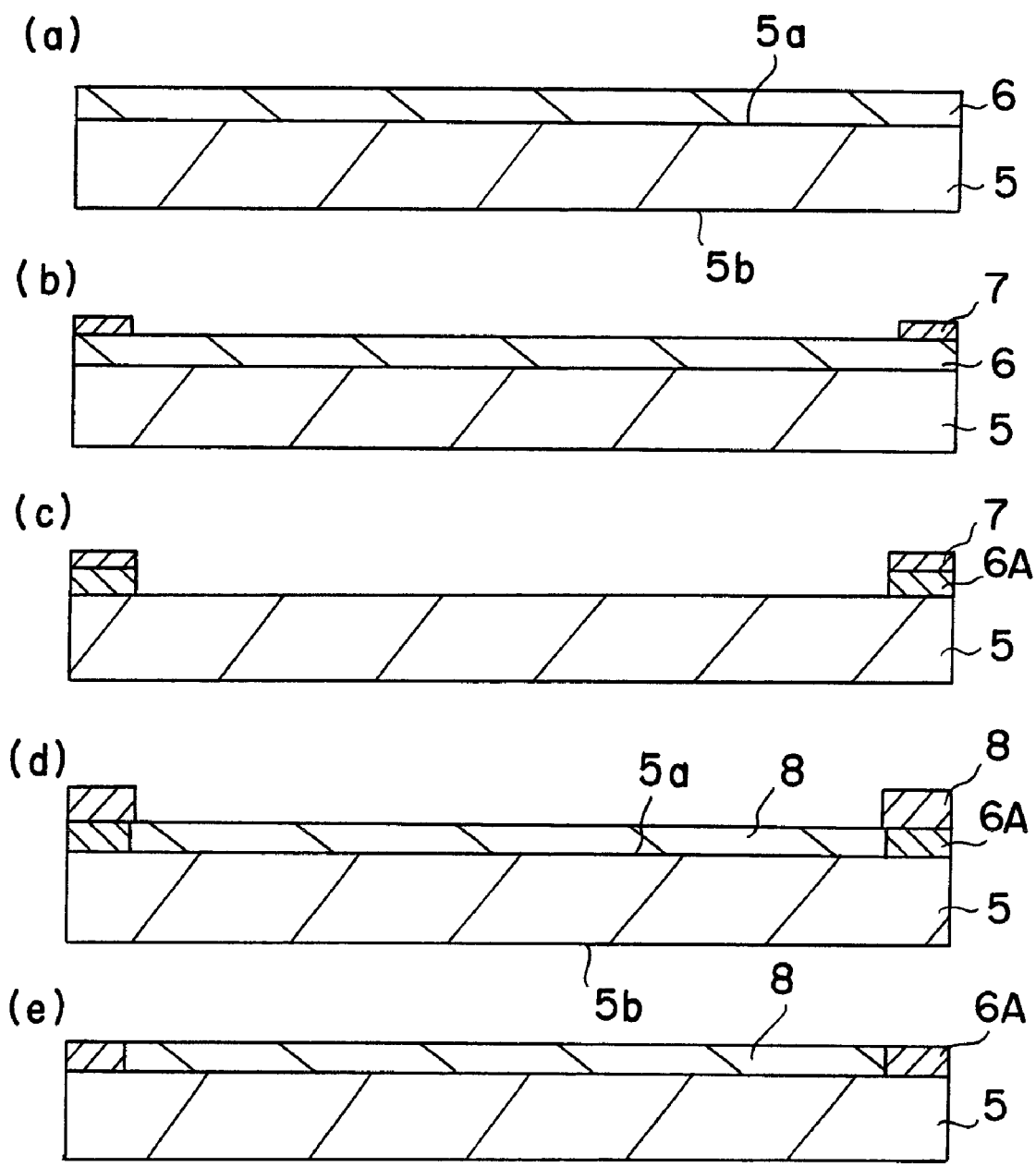
FIGS. 2(a), 2(b), 2(c) 2(d) and 2(e) are cross sectional views showing respective steps of forming a guard film 6A and a temporary supporting film 8 on a base substrate 5.

As shown in FIG. 2 (a), a metal film 6 is formed on a first main face 5a of the base body 5 for supporting the dielectric slab. The kind of the metal film on the base body is not particularly limited, and includes multilayered films of underlying Cr layer and Au layer laminated thereon, multilayered films of underlying Ti layer and Au layer laminated thereon, tungsten film and molybdenum film. The method of film formation is not particularly limited, and sputtering and vapor deposition are listed.

A resist 7 is then formed on the metal film 6 (FIG. 2 (b)). Photolithography and wet etching are applied to perform the patterning of the metal film to form a guard film 6A (FIG. 2 (c)). Unnecessary resist 7 is then removed with an organic solvent.

A temporary supporting film 8 is formed on the base body 5 and the guard film 6A. The supporting film 8 is to be removed at the subsequent step to make the thin film of the dielectric single crystal distant from the underlying base body. A second main face 5b of the base body is then fixed on a polishing jig for forming a face for adhesion with the substrate of the dielectric single crystal. The temporary supporting film is then ground until the supporting film on the guard film disappears (FIG. 5 (c)).

Although the material of the supporting film is not particularly limited, $SiO_2$, $Ta_2O_5$ and Ti are listed. Further, although the material of the guard film is not particularly limited as far as it has resistance against an etchant for the temporary supporting film, molybdenum and tungsten can be listed.

Further, the method of grinding the temporary supporting film and the guard film is not particularly limited, loose abrasive and polishing pad of unwoven cloth sheet may be listed.

Figure 3:
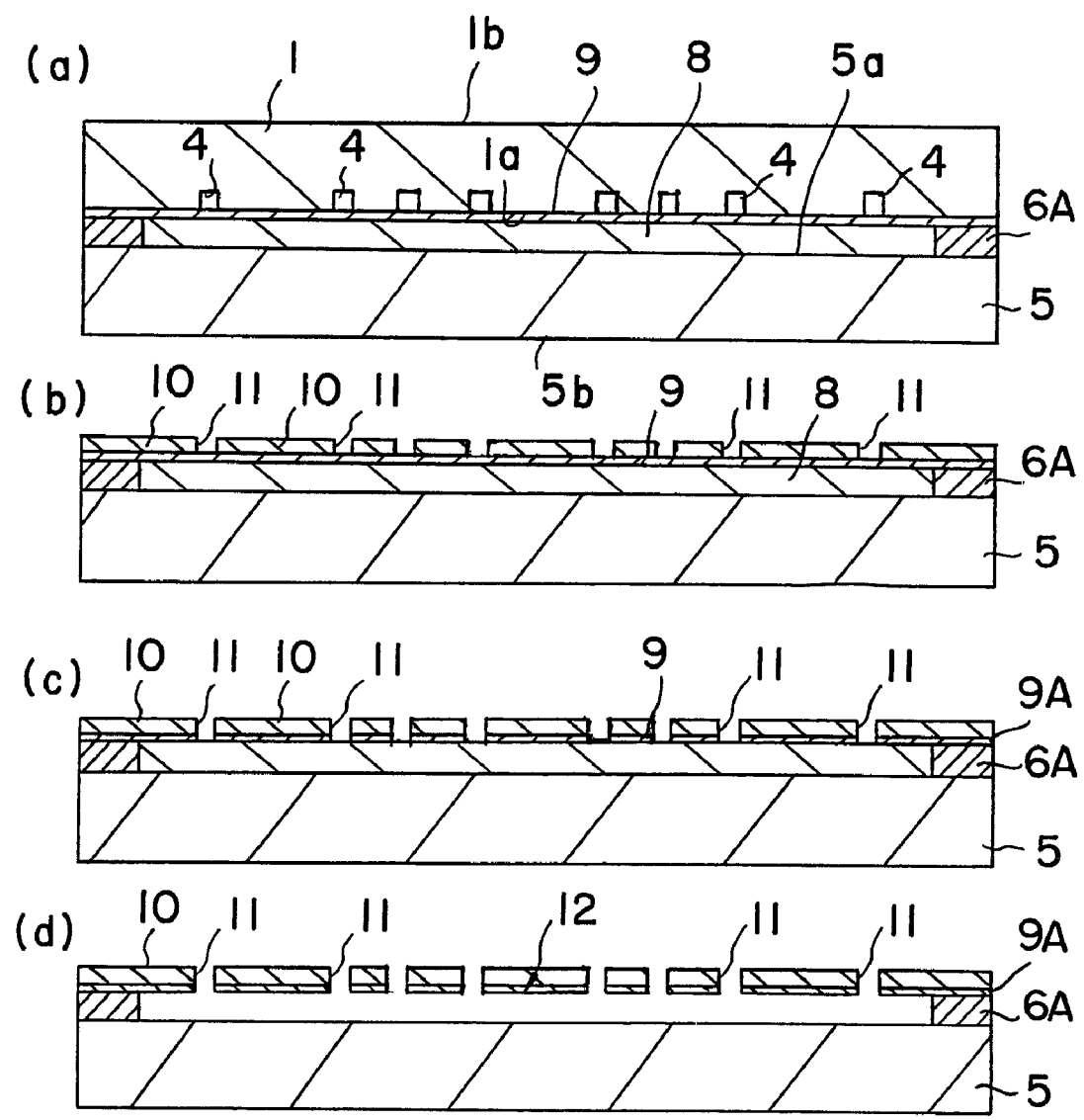
FIGS. 3 (a), (b), (c) and (d) are cross sectional views showing the respective steps of forming through holes 11 in the substrate of dielectric single crystal and of forming spaces 12 on the back side of the substrate 1.

The substrate 1 of dielectric single crystal is then ground at the main face 1b so that the recesses are opened to both of the main faces. That is, as shown in FIG. 3 (a), the guard film 6A and the supporting film 8 of the base body 5 are opposed to the main face 1a of the substrate 1. An adhesive is then interposed between them and cured to form an adhesive layer 9. The kind of the adhesive is not particularly limited, and includes a ultraviolet curable adhesive and a thermal curable adhesive.

After the base body 5 is adhered with and fixed onto the substrate 1 of dielectric single crystal, the second main face 5b of the base body 5 is adhered to and fixed on a polishing jig. The second main face 1b of the substrate 1 is then ground using a grinder and fixed abrasive to reduce the thickness of the substrate 1. The ground main face of the substrate 1 is subsequently polished so that the substrate 1 is further thinned. Finally, the substrate is finished using loose abrasive and polishing pad of unwoven cloth sheet to form a slab 10 of dielectric single crystal. Many through holes 11 are regularly formed in the slab 10 (FIG. 3 (b)).

The method of the mechanical processing may preferably be, but not limited to, the grinding and polishing described above. Further, the kind of the polishing process may preferably be, but not limited to, polishing using diamond abrasive. Further, the final thickness of the dielectric slab is not limited, and is decided depending on the specification of a target slab-type and two dimensional photonic crystal structure. However, as an example, the thickness of the dielectric slab may preferably be 0.1 to 1.0 µm.

From the state shown in FIG. 3 (b), the adhesive layer 9 and temporary supporting film 8 under the dielectric slab 10 was removed by etching. That is, an etchant is flown through the through holes 11 formed in the dielectric slab 10. Such etchant is not limited and includes hydrofluoric acid and ammonium hydrogen fluoride.

The adhesive layer 9A is removed as shown in FIG. 3 (c) and the supporting film 8 is removed by this etching process to form a space 12 (FIG. 3 (d)). As a result, spaces are provided over and under the dielectric slab 11 which functions as a device having the slab-type and two-dimensional photonic crystal structure.

Figure 4:
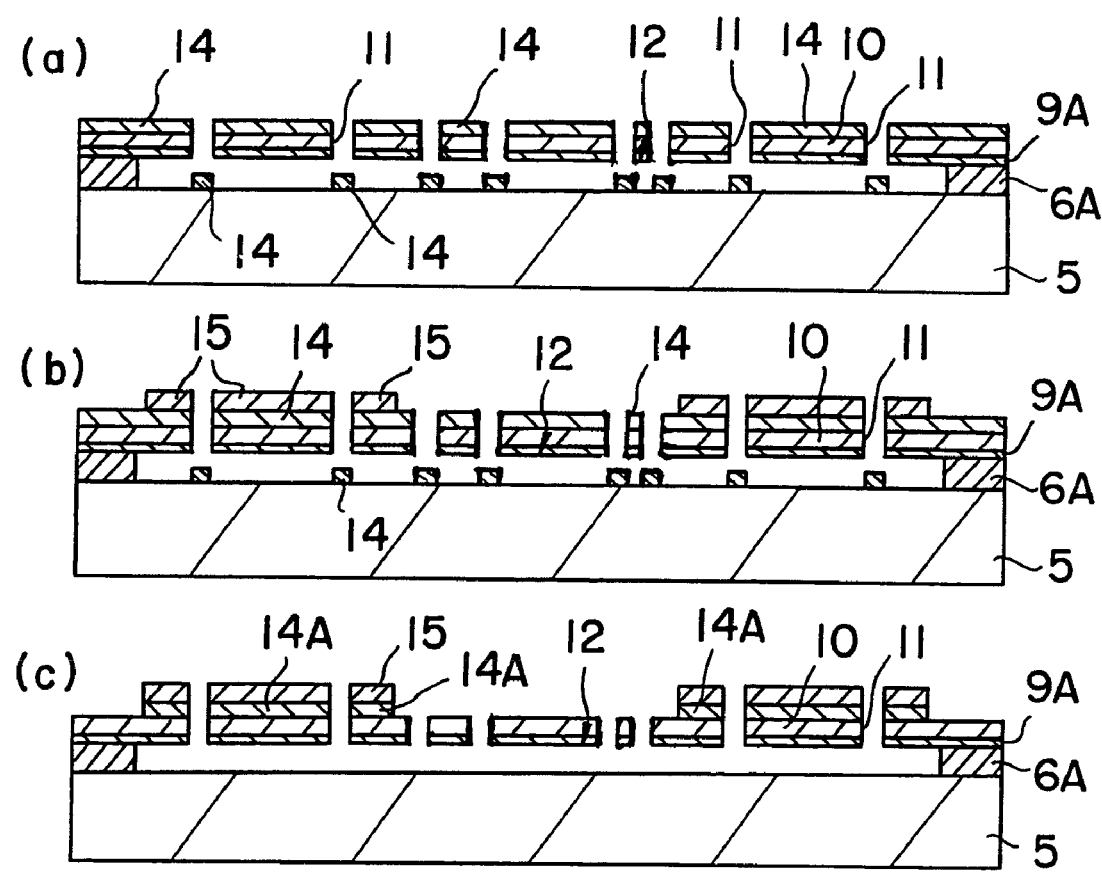
FIGS. 4(a), 4(b) and 4(c) are cross sectional views showing respective steps of forming an electrode 14A on the substrate of dielectric single crystal of FIG. 3 (d).

After the polished face of the dielectric slab 10 is washed with an organic solvent, a metal film 14 is formed over the whole of the polished face, as shown in FIG. 4 (a). The metal film 14 is also formed direct under the through hole 11. The kind of the metal film 14 is not particularly limited, and includes multilayered films of underlying Cr layer and Au layer laminated thereon, multilayered films of underlying Ti layer and Au layer laminated thereon, aluminum film and tungsten film. The method of forming the metal film 14 is not particularly limited, and sputtering and vapor deposition are listed.

The metal film is then patterned by conventional photolithography and subjected to wet etching to from the target electrode pattern 14A and to remove the electrode 14 on the substrate 5 (FIG. 4 (c)). Unnecessary resist 15 is then removed with an organic solvent to obtain a slab-type and two-dimensional photonic crystal structure 16A, as shown in FIG. 5.

Figure 5:
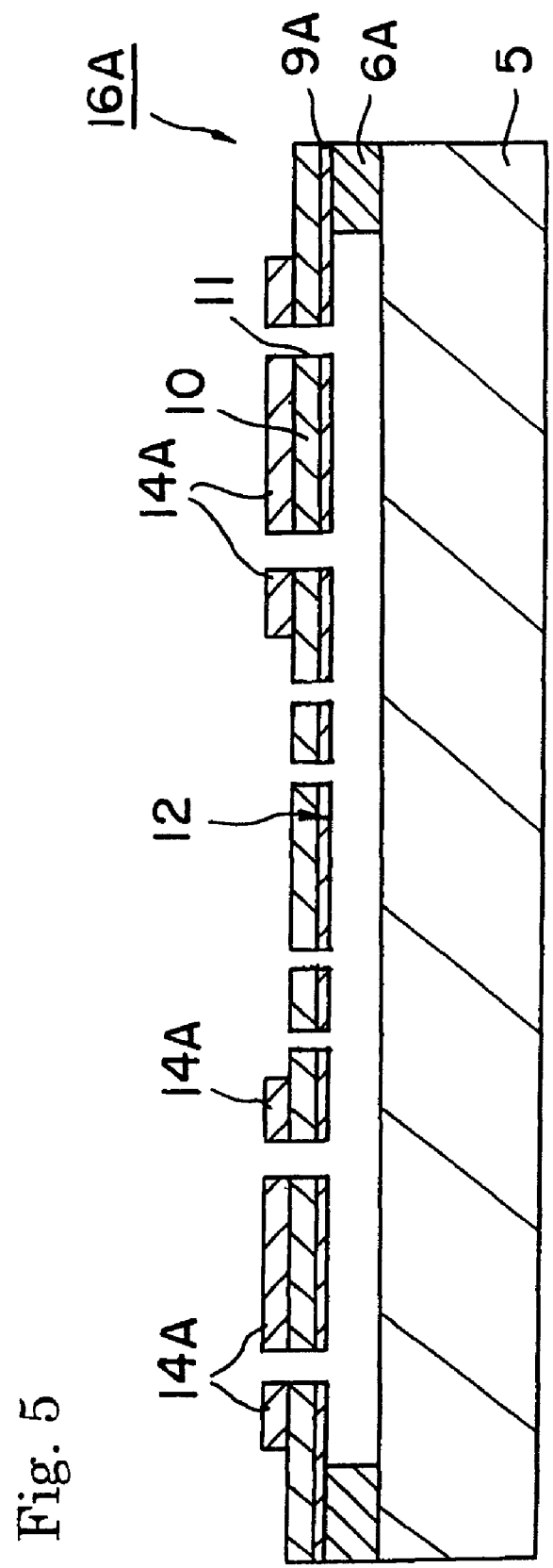
FIG. 5 is a cross sectional view showing a slab-type and two-dimensional photonic crystal structure 16A obtained according to the present invention.
Figure 6:
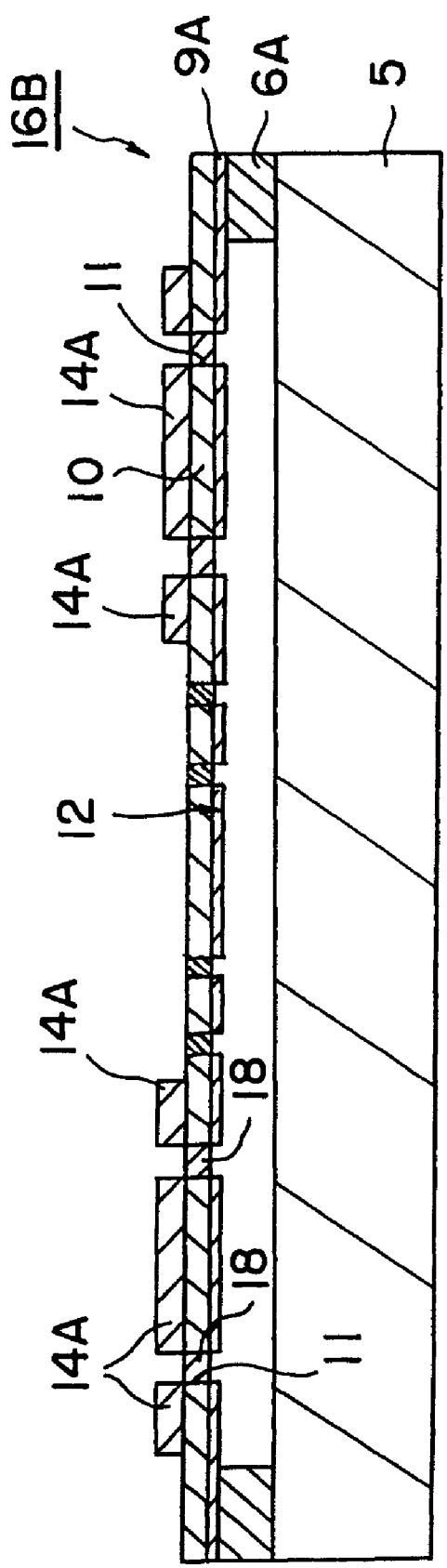
FIG. 6 is a cross sectional view showing a slab-type and two-dimensional photonic crystal structure 16B obtained according to the present invention.

Further, in the device 16A shown in FIG. 5, a dielectric material is filled in the through holes 11 to provide dielectric pillars 18 shown in FIG. 6. Such dielectric material includes novolak resin and epoxy resin.

Further, as shown in a device 16C of FIG. 7, the number of the through holes 11 between the electrode 14A and optical waveguide region may be increased. This kind of design is not particularly limited and may be variously changed.

Although the shape of the dielectric slab is not limited as far as a target electromagnetic wave can propagate in slab mode, the thickness of the slab may preferably be 5 µm or smaller and more preferably be 3 µm or smaller.

The optical waveguide structure of the present invention may be applied to various kinds of functional devices.

That is, in addition to conventional optical waveguide, the optical waveguide structure may be applied to a device utilizing Pockels effect, a device utilizing plasma effect caused by injection of current, a device utilizing EO effects due to quantum well structure, a device utilizing TO effects due to change of heater temperature, a directional coupler, Mach-Zehnder optical waveguide and an optical modulator.

The structure of the present invention is effective for electromagnetic waves. It is thus possible to obtain similar results as those of light wave in other electromagnetic waves by adjusting the material of the substrate and the period length "d". Such electromagnetic waves include microwave and terahertz wave.

EXAMPLES

The slab-type and two-dimensional photonic crystal structure 16A was produced according to the procedure described above referring FIGS. 1 to 5.
(Formation of Recesses in the Substrate 1)

The recesses 4 were formed in the dielectric substrate 1, according to the procedure described above referring to FIG. 1.

Specifically, it was prepared a circular wafer 1 made of lithium niobate single crystal having a thickness of 0.5 mm and a diameter of 3 inches. A molybdenum film 2 of a thickness of 0.1 µm was formed by sputtering as a mask over the whole of the first main face 1a of the dielectric substrate 1. The molybdenum film 2 was subjected to patterning by photolithography using a stepper and dry etching to produce a mask 2A.

The dielectric substrate 1 was then etched by wet etching using buffered fluoric acid heated at 65° C. to a thickness of 1 µm. Unnecessary resist 3 was removed with an organic solvent, and the mask 2A of molybdenum was removed with mixture of nitric acid and phosphoric acid, as shown in FIG. 1 (e)).
(Processing of Base Body)

A molybdenum film 6 was formed by sputtering to a thickness of 2 µm over the whole of the first main face 5a of the base body 5, for supporting the dielectric slab. The molybdenum film was then patterned by conventional photolithography and wet etching to form a guard film 6A. Mixture of nitric acid and phosphoric acid heated at 40° C. was used for the wet etching. Unnecessary resist 7 was then removed with an organic solvent and SiO₂ film was formed by sputtering at a thickness of 2.5 µm. The SiO₂ film was removed with buffered phosphoric acid in the subsequent step so that a space is formed between the dielectric slab and the base body. Further, The second face 5b of the base body 5 was then fixed on a polishing jig for forming a face for adhesion with the dielectric substrate. The laminated films of SiO₂ and molybdenum were then ground to a thickness of 1.5 µm using loose abrasive and polishing pad of unwoven cloth sheet (FIG. 2 (e)).
(Adhesion and Mechanical Processing of Substrate 1 and Base Body 5)

An organic adhesive forming an adhesive layer was applied on the main face 5a of the base body 5, and the main face 5a was adhered to the main face 1a of the substrate 1 with the recesses formed thereon. A pressure was applied onto the base body 5 and the dielectric substrate 1 with a pressing machine so that the thickness of the adhesive layer was reduced to 0.4 µm. The body 5 and substrate 1 were held in atmosphere at 200° C. for 1 hour to solidify the adhesive so that the base body and the dielectric substrate were adhered with each other.

After the base body 5 was adhered to and fixed on the dielectric substrate 1, the second main face 5b of the base body was adhered to and fixed on a polishing jig. The second main face 1b of the dielectric substrate 1 was ground with a grinder having fixed abrasive so that the thickness of the dielectric substrate 1 was reduced to 50 µm. Further, the thus ground main face 1b of the dielectric substrate 1 was then polished with diamond abrasive to further reduce the thickness of the dielectric substrate 1 to 2 µm. Finally, the dielectric substrate 1 was finished with loose abrasive and polishing pad of unwoven cloth sheet to reduce the thickness to 0.5 μm so that the recesses were opened to both main faces to form the through holes 11 (FIG. 3 (*b*)).

The thus integrated assembly was then immersed in buffered fluoric acid heated at 40° C. to supply buffered fluoric acid through the through holes 11 formed by the grinding. The SiO$_2$ layer 8 on the base body 5 was thus removed (FIG. 3 (*d*)).

After the thus polished face of the dielectric slab was washed with an organic solvent, aluminum film having a thickness of 0.02 μm was formed over the whole of the polished face by sputtering (FIG. 4 (*a*)). The aluminum film was patterned by conventional photolithography and then subjected to wet etching using phosphoric acid etchant heated at 40° C. to obtain target electrode pattern (FIG. 4 (*b*)). Unnecessary resist 15 was then removed with an organic solvent and the thus obtained assembly was cut into respective chips with a dicing saw. The photonic crystal device was thus obtained (FIG. 5).

The thus obtained slab-type and two-dimensional photonic crystal structure was proved to be available as a slab-type and two-dimensional photonic crystal device.

The invention claimed is:

1. A method of producing a slab type two-dimensional photonic crystal structure comprising a slab of a dielectric single crystal and a lattice column comprising through holes; said method comprising the steps of:

forming recesses in a substrate of a dielectric single crystal by etching a first main face of said substrate of said dielectric single crystal;

forming a guard film on a portion of a first main face of a base body and a supporting film on the remainder of said first main face of said base body;

then joining said guard film and said supporting film on said base body to said first main face of said substrate through an adhesive layer; and then forming a slab by grinding a second main face of said substrate so that said recesses pass through said slab to form said through holes.

2. The method of claim 1, further comprising the step of filling a dielectric material into said through holes to form dielectric pillars.

3. The method of claim 1, further comprising forming lattice columns in said slab of said dielectric single crystal by filling said recesses in said substrate with a dielectric material, said slab type two dimensional photonic crystal comprising said slab of said dielectric single crystal and said lattice columns.

4. The method of claim 3, further comprising removing said supporting film from said first main face of said base body after forming said slab of said dielectric single crystal, said slab type two dimensional photonic crystal comprising said slab of said dielectric single crystal and said lattice columns having spaces under and over said slab of said dielectric single crystal.

5. The method of claim 1, further comprising forming a metal layer on said first main face of said substrate, forming a resist on said metal layer, and etching said resist, said metal layer, and said first main face of said substrate to form said recesses on said first main face of said substrate.

* * * * *